July 27, 1926.
L. A. GESSNER
1,593,627
METHOD OF AND APPARATUS FOR ANNEALING AND COOLING SHEET GLASS
Filed Nov. 3, 1923     3 Sheets-Sheet 1
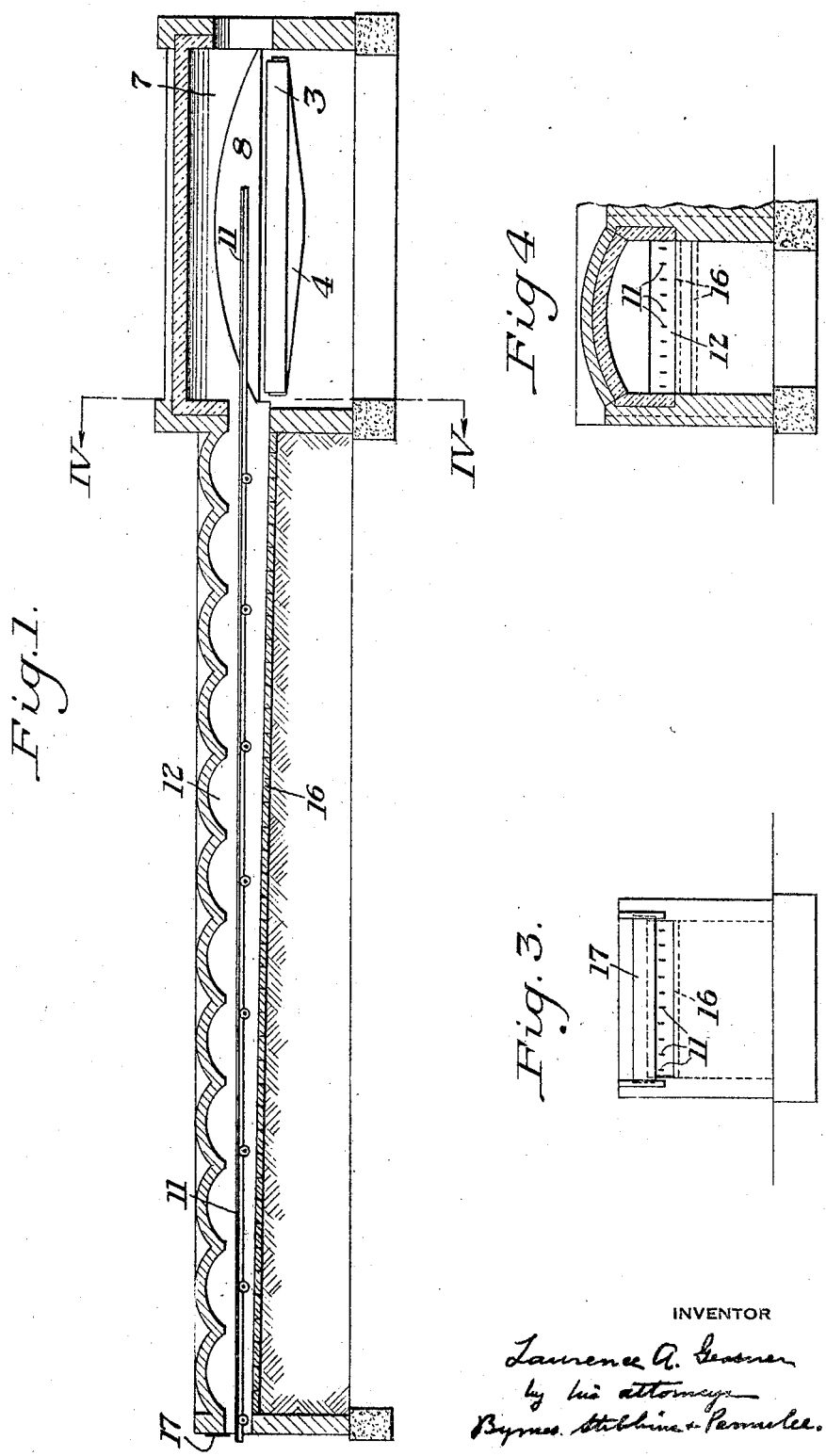
INVENTOR
Laurence A. Gessner
by his attorneys
Byrnes, Stebbins & Parmelee

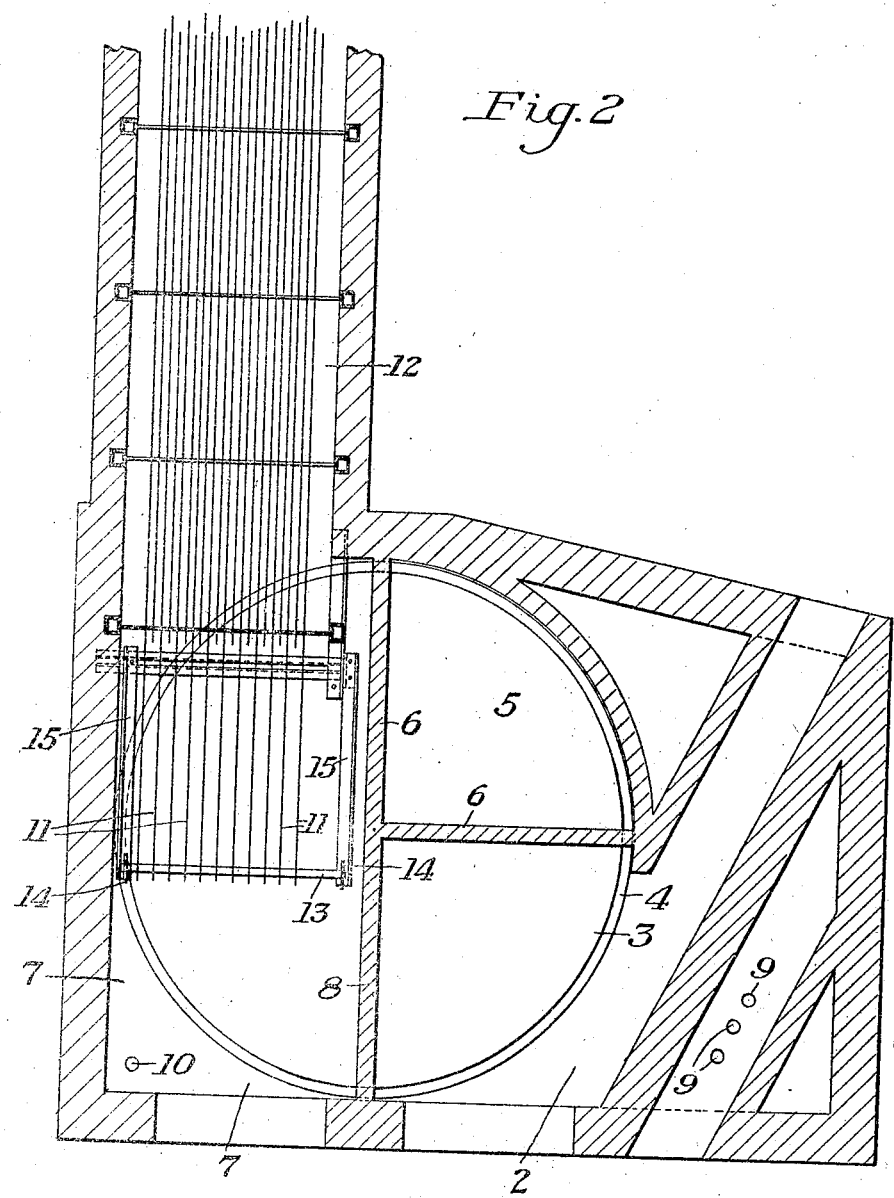

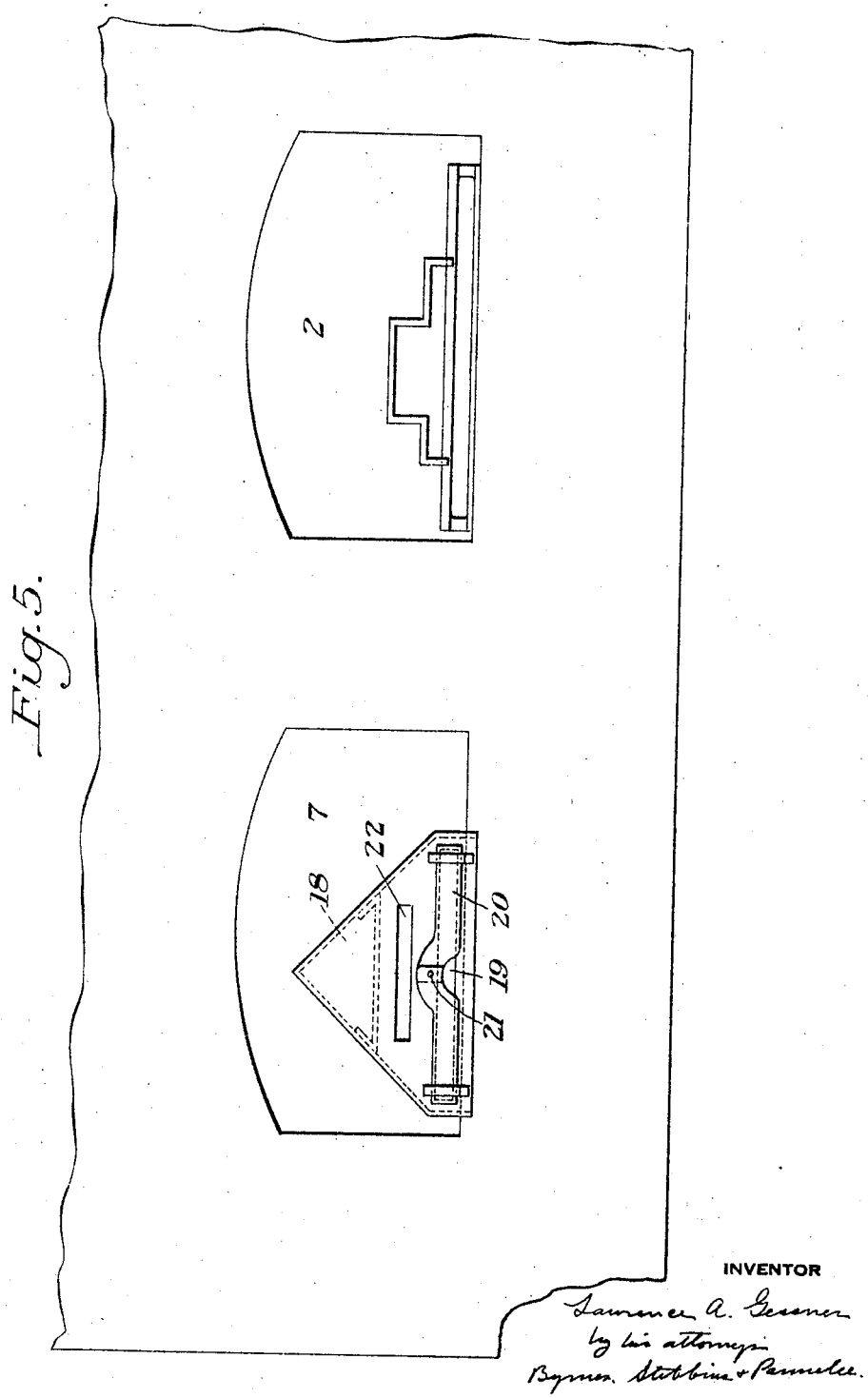

Patented July 27, 1926.

1,593,627

UNITED STATES PATENT OFFICE.

LAWRENCE A. GESSNER, OF JEANNETTE, PENNSYLVANIA, ASSIGNOR TO WINDOW GLASS MACHINE COMPANY, OF PITTSBURGH, PENNSYLVANIA, A CORPORATION OF NEW JERSEY.

METHOD OF AND APPARATUS FOR ANNEALING AND COOLING SHEET GLASS.

Application filed November 3, 1923. Serial No. 672,530.

This invention relates to the annealing and cooling of glass where the leer atmosphere receives heat not only from the glass itself, but from a chamber where a previous operation such, for example, as flattening is performed upon the glass. This previous operation, however, may consist of some other step, such as drawing a sheet from a molten bath of glass, provided the leer receives heated gases from such previous operation.

In such systems, difficulty has always been experienced in annealing the glass by gradual cooling due to warping or bending of the glass by strains set up in the sheet glass itself.

It will be understood that my process and apparatus do not relate to sagging of the edge portions of the sheet between supports in its passage through the leer since in that case the bending is due to improper supporting of the glass sheet and consequent bending due to the weight of the glass. My invention relates to the prevention of warping or distorting of the glass due to strains set up in the glass itself. I have discovered that where flat glass is delivered from a previous operation into a leer and carried through the leer, much of the warping and distortion has been due to improper distribution and direction of the gaseous currents within the leer.

In the ordinary flattening oven and leer system for window glass, for example, I have found that the space below the glass sheets has been of such a depth that currents of external air enter the delivery end of the leer below the glass sheets and pass back a considerable distance within the leer, sometimes substantially to its inlet or piling end adjacent to the flattening oven. Under actual tests on the ordinary type of such a flattening oven leer, I have found that the air flowed inwardly through the leer under the glass with the velocity as high as 175 feet per minute; while, at the same time, the gases from the flattening oven were flowing in the opposite direction to the delivery end above the sheets. In such a case, while a certain amount of the air below the sheet glass finds its way to that portion of the tunnel above the glass by passing around the edges of the sheets and between them, nevertheless the sheets passing through the leer form a substantial partition which to a large extent keeps the entering air below the glass, at least to such an extent as to cause a material difference in temperature between the upper surface portion of the glass sheets and their lower surface portion. Obviously, such a condition will cause permanent warping of the glass when it extends for any substantial distance from the delivery end.

In practice, this warping does occur from such causes. In the ordinary case where the atmosphere of the leer is materially cooler under the glass than it is above the glass, the upper surface of the glass will be convex, although flat when it was piled on the leer bars.

I have further discovered that by properly reshaping or reproportioning the lower portion of the leer tunnel as compared with the upper portion thereof, I can substantially prevent the external air from entering the delivery end of the leer at least to any substantial distance and can convert the leer into a horizontally extending stack in the sense that the heated gases from the previous operation will flow in the same direction both above and below the sheet glass to and out of the delivery end.

This, I have found, will prevent substantial warping of the sheet glass since it is bathed both above and below in currents traveling in the same direction with the glass.

In this changing of the lower portion of the leer tunnel, the portions more remote from the flattening oven or source of heat should be brought nearer the glass level and the remaining portions nearer the flattening oven may or may not be raised. Furthermore, to insure the proper speed of annealing, the delivery end of the leer should not be choked up sufficiently to prevent proper exit of the gases. If such end is too much choked up, the leer becomes too hot to provide for rapid annealing of the glass due to holding the heated gases too long in the leer.

As an example of an apparatus which delivers substantially flat glass and has been found efficient in operation, I will now refer to the drawings forming part of this application, in which—

Figure 1 is a vertical section through a piling oven and leer, the glass supports being of the well known rod type;

Figure 2 is a horizontal section showing a portion of the leer and the chamber wherein a previous operation is performed—in this case a flattening oven;

Figure 3 is a view in elevation of the delivery end of the leer;

Figure 4 is a section on the line IV—IV of Figure 1; and

Figure 5 is a front view of the flattening oven.

In the illustrated embodiment of the invention, there is shown a flattening oven 2 in which glass cylinders or shawls are flattened out on flattening stones 3 carried on a wheel 4 of usual construction. The flattened glass is partially cooled in a dummy oven 5 separated from the flattening oven by mantles or shades 6, and is further cooled while still on the flattening stone in a piling oven 7 separated from the flattening oven 2 and the cooling oven 5 by shades or mantles 8. The flattening oven 2 is heated in any desired manner, as by gas burners 9, and additional heat may be supplied to the piling oven 7 if desired, as by a gas burner 10. The flat sheet of glass is placed upon travel rods 11 by the operator for annealing and cooling in the leer tunnel 12.

It will be understood that the mechanism for advancing the glass through the leer may be of any desired form as, for example, rollers, but the rod type leer has been found to give good results, particularly with the construction shown in the drawings. It will be noted that the travel rods 11 have wide faces and are so proportioned as to prevent drooping of the side edge portions of the sheets. It will also be noted that the projecting ends of the rods 11 are supported on a cross bar 13 which in turn is supported by wheels 14 running on tracks 15. These precautions eliminate any bending of the sheets due to improper support.

The leer tunnel 12 in this embodiment of the invention comprises a horizontal flue of suitable brick work having a delivery opening materially smaller than the inlet opening. As shown in Figure 1, the leer is provided with a brick floor 16 which starts at the sill level at the piling end of the leer and terminates a short distance below the leer bars or rods at the delivery end thereof. It will be seen that the glass sheets form a practically continuous division throughout the leer and that hot gases passing into the leer tunnel from the burner 10 and from the flattening oven and under the shades or mantles are divided into two streams, one above the glass and one below the glass. No other source of heat is provided for the leer than those above mentioned. In practice it is found that this construction eliminates the ingress of outside air at the delivery end to any substantial distance. The gases enter the piling end of the leer, travel through it both above and below the glass and are effective for regulating the cooling of the upper and lower surfaces of the sheet so that both surfaces lose heat at substantially the same rate. There is undoubtedly a certain amount of communication between the upper and lower streams, not only between the sheets but also around the sides thereof, but an appreciable flow from the piling end to the delivery end of the leer can be observed at any point. Moreover, this flow is smooth and uninterrupted whereas in the old style deep bottom leer the flow, particularly below the glass sheet, was exceedingly turbulent and conducive to breakage by reason of the sudden subjection of the under portions of the sheets to cold air at various portions of the leer.

Even though the leer tunnel is horizontal, it apparently exerts a very definite stack effect, and causes the hot gases to pass out of the flattening oven through the leer tunnel. Tests made by producing smoke in the flattening oven 2 show that it passes under the shade 8 at considerable speed and travels down the leer tunnel. By reason of the elevation of the leer rods 11 above the flattening wheel which practically forms a floor for the flattening oven, the hot gases have an opportunity to pass through the portion of the leer tunnel lying below the glass, as well as the portion thereabove.

Tests have shown that while there is a certain amount of variation in the velocity of flow from top to bottom of the leer tunnel 12, nevertheless the flow is entirely toward the delivery end and is of substantially the same velocity immediately above and immediately below the glass.

The drawings illustrate a flattening oven and leer using a flattening wheel which is substantially seventeen feet in diameter in connection with a leer tunnel fifty feet long. At the piling end of the leer tunnel 12, as best viewed in Figure 4, there is a six inch clearance between the top of the glass sheets and the top of the tunnel opening and eighteen inches from the glass sheet to the bottom of the opening. At the delivery end of the leer the six inch clearance above the glass is maintained, but it is only eight and seven-eighths inches from the glass to the floor of the tunnel at this point. The leer is maintained seven feet wide throughout its entire length.

A sheet iron shade or damper 17 is placed above the leer bars at the delivery end of the leer and this may be moved up or down to vary the clear opening above the glass. It will be found that by adjusting this shade the relative velocity of the gases above and below the glass may be varied with a consequent variation in the cooling effect thereof and minor adjustments of the shade will be found of value in attaining the desired flatness of the product.

The system has been found equally satisfactory for both single and double strength window glass and the following temperatures have been observed during the handling of single strength glass: In the flattening oven 1440–1460° F.; in the piling oven 1030° F.; under the first arch of the leer and about two inches above the glass 860° F.; under the third, fifth, seventh and ninth arches of the leer and in the center thereof about two inches above the glass, 750° F., 670° F., 540° F. and 450° F., respectively, under the last arch of the leer 340° F. The same temperatures apparently obtain immediately below the glass and, as above pointed out, the velocities above and below the glass at any point are also substantially equal.

It is desirable in the example given to prevent the ingress of any outside air either at the delivery end or any other point through the system. Figure 5 is a partial elevation of that face of the flattening oven which is at the bottom of Figure 2, and shows an opening 18, called the piling opening, through which the operator works when removing the flattened glass from the flattening wheel 2 to the leer bars. His piling fork is handled through a wide opening 19 and shutters 20 pivoted at 21 are provided for substantially closing off the opening and yet allowing the utmost freedom in handling the piling fork. A sight opening 22 is also provided and if desired this may be stopped off by mica or wire glass. Neither of these form any part of the present invention, which relates to the elimination of strains set up in the glass itself by non-uniform cooling in the leer.

With the above described example of my invention, I have annealed more than forty sheets of single strength glass per hour in regular operation, these sheets being free from warping.

While the above description gives an example, the dimensions and description being sufficiently clear for those skilled in the art to practice the invention, it will be understood that I am not limited thereto since the proportions, dimensions, etc., will be varied under different conditions. Also, changes may be made in the formation of the leer bottom without departing from my invention, for example, the bottom may be stepped instead of sloped.

An important feature of my invention is that of bathing the upper and lower surfaces of the sheet glass traveling through the leer with heated gaseous fluid moving in the same direction. It is also of advantage and preferable to so arrange and proportion the parts that the glass shall lose heat at about the same rate from the top and bottom surfaces. The two most important factors in this are the temperature and the velocity of the two streams of gaseous fluid passing above and below the glass surfaces. If the temperatures of these two streams are nearly alike, their velocity should be nearly alike in corresponding portions of the tunnel or horizontal stack. If the temperatures of these streams differ materially, their velocity should be correspondingly altered.

In addition to loss of heat from the glass and the gases, there is probably loss of heat by radiation effect to the upper and lower portions of the leer enclosure. Obviously, when under my invention the gaseous fluids travel beneath the glass in the same direction as the glass, they bathe the floor of the tunnel as well as the glass, and I believe that under my new system the radiation effect is altered and bettered as compared to the old system. In the old system, the floor temperature was, of course, affected by the inflowing air currents and this would naturally lead to more radiation effect from the lower surfaces of the glass, while in my improved system this radiation effect downwardly is probably decreased, thus still more equalizing the loss of heat from the upper and lower surfaces of the glass.

In my example, I have described my system wherein there is very little dilution of the gases from the previous operation with air. If air were admitted to the leer tunnel either above or below in any material amounts, this would obviously vary the conditions and lead to a variance in my proportions and dimensions, particularly if more air were admitted above than below or vice versa. I mean by this, the admission of air through the top, bottom or sides of the leer as distinguished from air entering from the delivery end. If, for example, air were admitted in material amounts to the gas stream traveling above the glass thereby lowering the temperature of this stream, a larger proportion of heated products should enter above, or the velocity should be decreased, or both.

Correspondingly, if heating flues were provided below the floor of the tunnel tending to heat the floor of the tunnel, variations should correspondingly be made in the leer. In my preferred form, where the cross sectional area of the leer chamber is decreased toward the outlet, obviously this compensates to some extent for the contraction in the volume of the gaseous fluids flowing through the leer. The leer temperature decreases from the piling end toward the delivery end and hence the gases greatly decrease in temperature and contract correspondingly, hence better control of the gases is obtained by contracting the cross sectional areas either continuously or intermittently.

I provide an improved leer wherein strains due to non-uniform cooling are eliminated entirely or at least to such an extent that substantially flat glass is produced. The entire apparatus is simple in construction and operation and burners which have frequently been used along the leer tunnel are done away with. The turbulent condition of flow which existed in the old style apparatus is replaced by smooth laminar flow throughout the leer and better control of the product is thereby assured. The invention not only provides smooth gaseous streams which travel through the leer tunnel and do away with the turbulent condition formerly existing, but also provides a flow of the gaseous fluid along the under surface of the glass in such adjusted amounts as will substantially prevent warping or bowing of the glass in the leer. The adjusted amount of gaseous fluid as called for herein may be secured either by the initial construction of the leer which provides a permanent adjustment, or by other means which are of the nature of temporary adjustments.

It will be understood that various modifications may be made in the apparatus without departing from my invention as, for example, a flat roof may be used, rolls may be substituted for the leer rods and various other constructions resorted to without departing from the spirit or scope of my invention, for, while I have described an illustrative example thereof, the invention is not limited to such example but may be otherwise embodied within the scope of the following claims:

I claim:

1. In the method of making substantially flat sheet glass, the steps consisting in passing sheet glass through a leer, passing heated gaseous fluid through the leer in the same direction as the travel of the glass, and maintaining a substantially smooth and continuous flow of the gaseous fluid along the under surface of the glass in such adjusted amounts as will substantially prevent warping or bowing of the glass in the leer, substantially as described.

2. In the method of making substantially flat sheet glass, the steps consisting in feeding sheet glass through a leer, passing heated gaseous fluid through the leer in the same direction as the travel of the glass, and maintaining a substantially smooth and continuous flow of gaseous fluid above and below the sheet in such relative and adjusted amounts as will substantially prevent warping or bowing of the glass in the leer, substantially as described.

3. In the method of making substantially flat sheet glass, the steps consisting in feeding sheet glass through a leer, passing heated gaseous fluid through the leer in the same direction as the travel of the glass, and maintaining a substantially smooth and continuous flow of gaseous fluid above and below the sheet in such relative and adjusted amounts as will substantially prevent warping or bowing of the glass in the leer, the streams being of about the same temperature at or near the glass, substantially as described.

4. In the method of annealing and cooling sheet glass, the steps consisting of feeding sheet glass through a leer tunnel, admitting heated gaseous fluid to the tunnel from a previous operation on the glass, passing such gaseous fluid through the leer, and maintaining a flow of gaseous fluid above and below the sheet glass in the same direction as the travel of said glass, the streams being of about the same velocity at or near the glass, substantially as described.

5. In the method of annealing and cooling sheet glass, the steps consisting of feeding sheet glass through a leer tunnel, admitting heated gaseous fluid to the tunnel from a previous operation on the glass, passing such gaseous fluid through the leer, and maintaining a flow of gaseous fluid above and below the sheet glass in the same direction as the travel of said glass, the streams being of about the same temperature and velocity at or near the glass, substantially as described.

6. In the method of making substantially flat sheet glass, the steps consisting in passing sheet glass through a leer, admitting heated gaseous fluid to the leer from a previous operation on the glass, passing such gaseous fluid through the leer, maintaining a substantially smooth and continuous flow of the fluid along the under surface of the sheet glass in the same direction as the travel of the glass, the flow of fluid along the under surface of the glass being in such amounts as will substantially prevent warping or bowing of the glass in the leer and preventing air in substantial amounts from entering the delivery end of the leer below the glass to any substantial distance therein, substantially as described.

7. In the method of making substantially flat sheet glass, the steps consisting in passing sheet glass through a leer, admitting heated gaseous fluid to the leer, passing such gaseous fluid through the leer, maintaining a substantially smooth and continuous flow of the fluid along the under surface of the sheet glass in the same direction as the travel of the glass, the flow of fluid along the under surface of the glass being in such amounts as will substantially prevent warping or bowing of the glass in the leer and preventing air in substantial amounts from entering the delivery end of the leer below the glass to any substantial distance therein, substantially as described.

8. In an annealing and cooling system for sheet glass, a horizontally extending leer, means for supporting glass therein between the top and bottom of the leer, and a source of heated gases, the leer having an opening above and below the glass level and permitting the flow of such gases from the source through the tunnel in streams above and below the glass, the leer being of smaller cross-sectional area at the delivery end than at the entering end thereof, substantially as described.

9. In an annealing and cooling system for sheet glass, a horizontally extending leer, means for supporting glass therein between the top and bottom of the leer, and a source of heated gases, the leer having an opening above and below the glass level and permitting the flow of such gases from the source through the tunnel in streams above and below the glass, the portion of the leer below the glass decreasing in cross-sectional area from the entering end to the delivery end of the leer, substantially as described.

10. In an annealing system for sheet glass, a leer tunnel having a floor, and means for supporting the glass in the leer substantially in a plane spaced from the floor, the floor sloping toward the plane of the glass sheets from the entering end to the delivery end of the leer, substantially as described.

11. In a system for working on sheet glass, a flattening oven and a leer connected therewith, means for passing glass through the leer, the flattening oven being adapted to supply heated gases to the leer in streams above and below the glass and the leer being of smaller cross-sectional area at the end remote from the flattening oven than at the end adjacent the flattening oven, substantially as described.

12. In a system for working on sheet glass, a flattening oven and a leer connected therewith, the leer having means for passing glass therethrough, the flattening oven being adapted to supply heated gases to the leer above and below the glass and the leer decreasing in cross-sectional area from the flattening oven to the remote end of the leer, substantially as described.

13. In a system for working on sheet glass, a flattening oven, a leer connected therewith, and means within the leer for supporting sheet glass in such manner as to permit the passage of heated gases from the flattening oven through the leer in streams above and below the glass, the leer providing a relatively small cross section for the passage of gases below the glass and providing a relatively small outlet below the glass for such gases, whereby air is prevented from entering the delivery end of the leer below the glass to any substantial distance, substantially as described.

14. In a system for working on sheet glass, a chamber wherein an operation is performed on the glass, a leer connected therewith, and means within the leer for supporting sheet glass in such manner as to permit the passage of heated gases from the flattening oven through the leer in streams above and below the glass, the leer providing a relatively small cross section for the passage of gases below the glass and providing a relatively small outlet below the glass for such gases, whereby air is prevented from entering the delivery of the leer below the glass to any substantial distance, substantially as described.

15. In a system for working on sheet glass, a chamber in which an operation is performed on the glass, a leer connected therewith whereby the glass may be removed from the chamber, the chamber being adapted to supply heated gases to the leer, means in the leer for supporting the glass to leave a relatively large portion of both the upper and lower surfaces of the glass to the action of the heated gases passing through the leer, and means for varying the relative velocities of the gaseous fluids above and below the sheet glass, substantially as described.

16. In the method of making substantially flat sheet glass, the steps consisting in supplying flat hot glass to a horizontally extending leer tunnel, supplying streams of heated gases to the tunnel above and below the glass level adjacent the end of the tunnel where the glass enters and permitting the streams to travel through the tunnel, the gases forming the lower stream being supplied in suitable adjusted amount to sufficiently retard the loss of heat from the under surface of the glass as to obtain a substantially equal rate of heat loss from both faces of the sheet glass, substantially as described.

In testimony whereof I have hereunto set my hand.

LAWRENCE A. GESSNER.